United States Patent [19]

Virey et al.

[11] Patent Number: 5,073,182
[45] Date of Patent: Dec. 17, 1991

[54] PROCESS FOR MANUFACTURING GLASS OBJECTS INCLUDING SPRAYING A CRYOGEN ONTO THE GLASS SURFACE

[75] Inventors: Franck Virey, Paris; Daniel Goumy, Saint Egreve, both of France

[73] Assignee: L'Air Liquide, Societe Anonyme Pour L'Etudeet L'Exploitation Des Procedes Georges Claude, Paris, France

[21] Appl. No.: 489,858

[22] Filed: Mar. 5, 1990

Related U.S. Application Data

[63] Continuation of Ser. No. 297,702, Jan. 17, 1989, abandoned.

[30] Foreign Application Priority Data

Jun. 19, 1987 [FR] France ................... 87 08666

[51] Int. Cl.$^5$ ................... C03B 32/00; C03B 35/04
[52] U.S. Cl. ................... 65/84; 65/85
[58] Field of Search ........... 65/348, 161, 115, 104, 65/29, 69, 84, 85, 111, 260, 267

[56] References Cited

U.S. PATENT DOCUMENTS

| | | | |
|---|---|---|---|
| 124,378 | 3/1872 | Oesterling | 65/348 |
| 1,894,576 | 1/1933 | Tremblay | 65/348 |
| 2,253,155 | 8/1941 | Wadman | 65/348 |
| 2,302,078 | 11/1942 | Wadman | 65/348 |
| 2,365,138 | 12/1944 | Mongan | 65/348 |
| 2,386,455 | 10/1945 | Green | 65/348 |
| 2,627,702 | 2/1953 | Lowe | 65/348 |
| 2,660,831 | 12/1953 | Rowe | 65/348 |
| 2,833,088 | 5/1958 | Olson | 65/348 |
| 3,077,096 | 2/1963 | Olson | 65/348 |
| 3,236,620 | 2/1966 | Wiley | 65/84 X |
| 3,303,013 | 2/1967 | Mumford | 65/348 |
| 3,361,551 | 1/1968 | Reynolds | 65/84 X |
| 3,416,908 | 12/1968 | Goodwin et al. | 65/111 X |
| 3,854,921 | 12/1974 | Jones | 65/161 |
| 3,860,407 | 1/1975 | Fertik | 65/161 |
| 3,883,339 | 5/1975 | Michalik et al. | 65/104 |
| 4,022,604 | 5/1977 | Dawson | 65/348 |
| 4,375,368 | 3/1983 | Stevenson | 65/161 |
| 4,548,635 | 10/1985 | Nebelung | 65/84 |
| 4,708,730 | 11/1987 | Ziegler et al. | 65/265 |
| 4,840,656 | 6/1989 | Ziegler et al. | 65/85 |

Primary Examiner—Richard V. Fisher
Assistant Examiner—John M. Hoffmann
Attorney, Agent, or Firm—Curtis, Morris & Safford

[57] ABSTRACT

A process for manufacturing glass objects such as bottles, in which a cold fluid containing a cryogen is sprayed around and/or under the bottles in the region of the transfer tongs and/or of the standby table in order to accelerate the cooling of the bottles and improve the quality of the latter and the productivity of the manufacturing machines. This cooling may be accompanied by a localized, or complete quenching of the bottle.

9 Claims, 6 Drawing Sheets

PROCESS FOR MANUFACTURING GLASS OBJECTS INCLUDING SPRAYING A CRYOGEN ONTO THE GLASS SURFACE

This application is a continuation, of application Ser. No. 297,702, filed Jan. 17, 1989, now abandoned.

BACKGROUND OF THE INVENTION

The present invention relates to a process for manufacturing glass objects comprising in particular a step for feeding at least one mould with a glass gob in the viscous liquid state, a step for forming the object in the mould, a step for extracting and conveying the glass object during which the glass object is still at a temperature which is sufficiently high to be deformable, followed by a step for placing the glass object on a transfer belt.

Machines for manufacturing glass objects such as bottles are fed with a molten glass parison whose viscosity is such that this parison may assume its final shape within a given period of time depending on the manufacturing cycle. The glass parison arrives in the mould at a temperature higher than the operating temperature and then is shaped within the mould either mechanically or by blowing, and then the produced glass article is extracted from the mould by suitable means such as tongs in the case of bottles which take hold of the bottle under the lower ledge of the neck which cools more rapidly than the rest of the bottle. The glass object is then conveyed (by means of the tongs) to a standby plate above which it is immobilized. This plate is perforated, and cooling air at ambient temperature is blown in order to accelerate the cooling. When its temperature is lower than the glass deforming temperature, the object is placed on the standby plate, and it is then placed on a transfer belt which conveys the articles into an annealing furnace or any other intermediate machine.

During its forming, the glass object is put in contact with one or more moulds for the purpose of being simultaneously shaped and cooled. Problems arise in respect of the shaped object when the glass, upon contact with the mould, is excessively cooled, when it is cooled too quickly or excessively unevenly or when it is not sufficiently cooled. It is usually found that an excessive or uneven cooling results in corrugations on the skin of the glass articles, while an excessively rapid cooling results in glazing, i.e. the beginning of breaking.

An insufficient cooling causes the glass to adhere to the walls of the mould, and deformation of the glass articles is produced.

The applicants have found that these various problems were due to a bad adjustment of the principal parameters involved in the cooling of the glass, i.e. the temperature of the mould or moulds, the time of contact between the glass and the mould, and/or the pressure of contact between the glass and the mould.

French patent application No. 86/17759 filed on Dec. 18, 1986 and entitled, "Process of manufacturing glass objects" solves the problems of the cooling of the moulds and the glass-mould contact time.

The temperature of the moulds varies cyclically in the course of manufacture. The amplitude of these variations diminishes as one moves away from the surface in contact with the glass. It has been found that this temperature variation is substantially zero on the outer surface of the moulds.

However, it frequently occurs that a certain number of disturbances are added in the course of time to these cyclic variations. The applicants have found that these variations were due to variations in the exterior temperature of the air, unequal cooling from one mould to another, and/or changes in the pressure of the cooling air.

Consequently, it appears that the control of the temperature of the glass and consequently the temperature of the moulds and the cooling of the latter constitute the essential elements if defects on the glass articles in the course of their forming are to be avoided.

It is known from the article entitled "Automatic Control of Mold Cooling Wind" published in the report of the "36th Annual Conference on Glass Problems", to put the pressure of the cooling air under the control the variations in the temperature of this air. Thus, when the temperature of the ambient air increases during the day, for example, the pressure of the cooling air and therefore the flow of the latter is increased while, when the ambient air drops in temperature, for example in the wintertime or during the night, the pressure of the cooling air and therefore the flow of the latter is reduced. According to the results indicated in this article, such a process permits improving the cooling of the moulds on average in the course of time without however solving the problem posed by the various aforementioned disturbances. In the abovementioned technique, the cooling air is generally produced by means of a powerful ventilation which imposes a circulation of air at a high rate of flow around the manufacturing machine.

After having solved the problems discussed hereinbefore, the applicants have found the existence of problems related to the step for extracting and conveying the glass object.

When he attempts to increase the productivity of the machine, in the course of this step, the man skilled in the art will turn to the technique taught in the article referred to hereinbefore, which consists in increasing the pressure of the ventilating air in an attempt to lower the temperature of the glass article more rapidly. This operation causes an increase in the impulse of the cooling fluid which, when it encounters the still-hot object, has a tendency to deform it. This phenomenon is particularly noticeable in respect of hollow bodies having long necks such as bottles. The glass object leaves the mould with a still-high skin temperature. Although the skin would have solidified, the core of the object is still in a deformable state.

Furthermore, the ventilated air ducts and the fan are often of insufficient dimensions which does not permit optimizing the rate of cooling of the glass articles.

SUMMARY

The present invention proposes in particular cooling the glass objects more rapidly between the instant at which they are extracted from the mould and the instant at which they may be placed on a surface such as a transfer belt. For this purpose, the present invention proposes projecting a cold fluid having a temperature lower than the ambient temperature around and/or on the glass object, during at least a part of the aforementioned step. This cold fluid may be a cold gas obtained from a cryogenic liquid, which is either pure or in a mixture, in variable proportions depending on the contemplated temperature, with the ambient air. This cold fluid may also be a cold gas obtained by cooling in an exchanger.

This cold fluid may also be a cryogenic liquid sprayed directly onto the chosen part of the glass object in order to cool it more rapidly. This last-mentioned technique provides a more rapid cooling of the article, which permits in particular increasing productivity. The use of sprayed cryogenic liquid moreover permits, in certain cases, avoiding ventilation, which improves the energetic efficiency of the machine, and contributes to the elimination of deformations of the glass object. The spraying of a cryogenic liquid spray such as, in particular, nitrogen or carbon dioxide, may be in particular carried out under conditions which permit completely or partly quenching the glass object on the outside and/or inside.

The cold gas or the liquid may be injected during the whole of this step or during only a part thereof.

Two periods appear to be particularly adapted for the treatment: the first corresponds to the step in which the object is conveyed from the final mould, such as the finishing mould, to the standby plate, while the second corresponds to the standby step above the plate (possibly on the latter, before transfer to the transfer belt).

As concerns the first period, the treatment will be carried out, when there is used a sprayed cryogenic liquid or possibly compressed air cooled in an exchanger, or by injection of cryogenic liquid, preferably in the region of the tongs for transporting the object.

For example, in the case of bottles, this treatment will be preferably carried out in the region of the neck and shoulder of the bottle, in the vicinity of the transfer tongs.

As concerns the second period, the treatment will be carried out preferably in the region of the face of the object confronting the standby plate. In particular, in the case of bottles, this treatment (by means of sprayed cryogenic liquid or compressed air cooled in an exchanger or by injection of cryogenic liquid) will be preferably carried out in the region of the bottom of the bottle, and specifically at the annular bearing surface of the bottle (or of the goblet) and on the adjacent surfaces, such as the outer cylindrical surface of the bottle adjacent to the bottom.

The cold gas and/or the air-cold gas mixture may be injected and ventilated around the glass object and may have a substantially constant temperature. On the other hand, it may be desirable in certain cases to progressively lower the temperature of the gas to avoid producing an excessive thermal shock on the glass. In other cases, it has been found desirable, on the contrary, to suddenly lower the temperature of the ventilating gas, for example when the object is above the standby plate, so as to produce a surface hardening of said object, and particularly the part of the latter initially receiving the ventilating gas, such as the lower part of a bottle on which latter must bear on the transfer belt and/or the part in the vicinity of the neck and/or the shoulder of the bottle.

This surface quenching permits rapidly hardening the concerned part of the glass object and avoids the subsequent deformations of this object, which improves the mechanical resistance of the object (In the case of glass bottles, for example, the surface quenching increases the resistance to pressure).

Different embodiments of the invention may be envisaged which are described hereinafter.

A first embodiment comprises injecting into the ventilating air of a machine or a plurality of machines, each machine having a plurality of moulding and/or ventilating sections for the glass objects, a cryogenic liquid such as liquid nitrogen or carbon dioxide, or a cold gas such as air cooled in a thermal exchanger or a cold gas such as gaseous nitrogen vaporized from liquid nitrogen, on the upstream side of the system of the plurality of pipes each connected to a standby plate. The temperature of the cooling air sent toward each object is therefore in this case substantially the same.

A second embodiment comprises cooling the ventilating air in the region of each standby plate, i.e. in the region of each section: the ventilating air is at ambient temperature (or cooled as above) in the ventilating air supply pipe of a section and is cooled in the region of each standby plate. The temperature of the cooling air may in this way be controlled section by section. In this embodiment, the temperature of the cooled ventilating air may be measured, for example, under the plate in proximity to the injection nozzle of air or possibly liquefied cooling gas.

Preferably, the injection of the cold gas will be effected sequentially in synchronization with the arrival of an object in the vicinity of the standby plate.

This sequential injection preferably slightly anticipates the arrival of the object so that the temperature of the ventilated air is minimum when the object arrives above the standby plate. In this way, according to this technique of controlled sequential injection, the standby time of each object is reduced to thus increase the productivity of the machine. Indeed, it should be noted that when the ventilating air is not cooled, the section having the lowest efficiency imposes on the other sections their working times, and therefore the standby time. In certain cases, some of the sections could work faster than others since their ventilation is more effective. On the other hand, with the process according to the invention, it is sufficient to inject more negative calories in the slower sections in order to bring all of them to a minimum transport time from the extraction to the placing on the transfer belt which only depends on the physical characteristics of the glass and the gas ventilated around the objects.

In all cases, the mould/standby plate coolings may be coupled by using the same cooling module of the air ventilated around the moulds and around the standby plate. In using an injection nozzle in the region of each mould or standby plate, it is possible to control the cooling differently for each section and inside each section, according to any one of the embodiments envisaged in the aforementioned French application associated with any one of the modes of the present invention.

According to an embodiment of the invention, the surface quenching of one or more faces of the glass object takes place between the instant the object is ready to leave the finishing mould and the instant the object is at an adequate temperature to be transferred to the transfer belt.

This surface quenching itself comprises several embodiments which may be employed alone, independently of the others, or together, or simultaneously, or sequentially.

A first embodiment concerns, as is the case of the previously-described embodiments employing a cold gas, avoiding deformations of the glass article at the exit of the finishing mould. In order to obtain a rapid cooling of the zones liable to be deformed, in particular the neck and/or the shoulder of a bottle, without deformation of said zones resulting from an increase in the ventilating air flow which would then become excessive, there is effected a spraying of cryogenic liquid onto the zone to be surface quenched. Dependant upon the distance between the ventilating nozzle, the cryogenic liquid flow may arrive on the surface either still partly in the liquid or solid state, in which case a quenching is achieved, or in the gaseous state which, depending on its temperature, will effect a quenching or a simple cooling.

The equipment required for carrying out this embodiment may comprise a tore provided with holes, slots, nozzles, etc. The tore is connected to tongs handling the object. In the case of a bottle, for example, the tongs also slide around the neck. The spraying of the liquid will preferably be effected in successive sequences, for example as soon as the tongs have seized the glass article, during the stage in which it is transferred from the finishing mould to the standby plate, etc.

This sequential spraying has two advantages: a first advantage is the minimum consumption of cryogenic fluid (relative to a continuous spraying) while a second advantage is the increase in the production rate of the machine, i.e. decreasing the time during which the bottle or other glass object stays above the standby plate, which stay is usually a few seconds according to the prior art.

A second embodiment of the quenching system increases the mechanical properties of the bottom of the article, on its outer surface, by a cryogenic quenching. An advantage of this quenching is the increase in the mechanical properties of the sensitive zone of the glass article, namely the zone subjected to friction when transporting the article from the finishing mould to the final packing step. This sensitive zone would otherwise be subjected by said friction, to breaking and hence the rejection of the article upon the final quality control. The quenching system therefore increases the productivity of the machine for a given production rate.

A third embodiment of this surface quenching comprises spraying the cryogenic liquid (or the solid in the case of $CO_2$ expanded in the form of snow) on all of the outer and/or inner surfaces of the glass object, in particular a bottle, in order to improve its mechanical properties and the productivity of the bottle manufacturing machines. The apparatus for carrying out this mode includes a tore provided with slots placed around the neck for quenching the outer side of the bottle, and a perforated rod. The supply of the quenching medium is coupled to both the rod and the tore, and the rod is introduced in the neck for quenching the interior of the bottle. Preferably, this quenching will be carried out when the bottle is above the standby plate in order to simultaneously quench the bottom of the bottle. The total quenching generally requires a simultaneous rectoverso quenching of the inner and outer surfaces of the object.

It has been found that, in order to obtain a partly quenched glass layer (according to the invention) i.e. to obtain a quenched glass layer on the order of 2-3 mm thick on the desired part of the glass article, it is preferable to obtain a coefficient of exchange H between about $1 \times 10^{-2}$ and $3 \times 10^{-2}$ $Cal \times cm^{-2} \times s^{-1} \times K^{-1}$. When the thickness of the quenched layer increases, it is found that there is a slight decrease in this coefficient which however remains of a similar order of magnitude. These values of coefficient H are given for temperature differences between the cryogenic fluid and the glass of about 850K, i.e. a glass object whose temperature is about 650° C. when liquid nitrogen is used (at $-196°$ C.). If liquid carbon dioxide is used (usually stored at $-20°$ C., 20 bars) this coefficient varies between about $7 \times 10^{-3}$ and $2 \times 10^{-2}$ $Cal \times cm^{-2} \times S^{-1} \times K^{-1}$.

When the coefficient H is lower than the lower limit mentioned above, it is found that the quenching is not obtained, while, when the coefficient H is higher than the upper limit mentioned above, the shock is excessive and the glass object is destroyed.

Of course, the liquefied gases which may be employed for this quenching are all commercially available liquefied gases which have no chemical interaction with the glass and have no physical interaction with the glass other than a thermal exchange, unless another physical interaction is also desired. There is preferably employed liquid nitrogen or liquid carbon dioxide. The latter, which may be used in all the embodiments of the process according to the invention, will be particularly advantageous for the quenching. Indeed, during the cryogenic liquid spraying stage, the vaporized liquid drop forms a layer of gas in proximity to the surface to be cooled (the same is true of a solid particle of carbon dioxide snow).

In order to ensure that the liquid drop or the following solid particle can come in contact with this same surface, sufficient kinetic energy is required to enable it to pass through said gas layer. Such energy may be obtained from the storage pressure of the reservoir.

With liquid nitrogen, a correct quenching may be realized when the storage pressure in the reservoir is higher than or equal to about 2.5 bars in relative pressure (3.5 bars absolute), the best results being obtained at about 5 bars relative pressure. Such a pressure requires the use of a high-pressure cryogenic reservoir of the evaporator type or the installation of a pump for achieving these pressures. This increases the costs of the installation.

In the case of carbon dioxide, these problems generally do not exist. Indeed, the liquid carbon dioxide is generally stored at $-20°$ C. and 20 bars, which is a sufficient pressure to ensure that the carbon dioxide snow particles, formed by the direct expansion at ambient pressure and temperature, have the required energy.

In both cases, however, the consumptions of fluid are substantially identical.

The process according to the invention is characterized in that, during at least a part of the glass object extracting and transporting step, there is sprayed partly or completely around and/or on the latter a cold fluid such as air cooled to a temperature lower than the ambient temperature, the flow of cold fluid remaining lower than the limit value beyond which deformations of the glass object are found to occur.

The cold fluid will preferably be chosen from among cryogenic fluids such as nitrogen or liquid carbon dioxide, or among gases, such as air cooled mechanically (by mechanical refrigerating means) or by thermal exchange with a cryogenic liquid or a very cold gas in a heat exchanger, or cooled to a temperature lower than the ambient temperature by spraying a cryogenic liquid into the ventilating gas or injecting gas at a temperature lower than that of the ventilating gas or air in the latter.

A better understanding of the invention will be had from the following embodiments given by way of non-limitative examples together with the Figures which represent:

DESCRIPTION OF CERTAIN PREFERRED EMBODIMENTS

Figure 1:
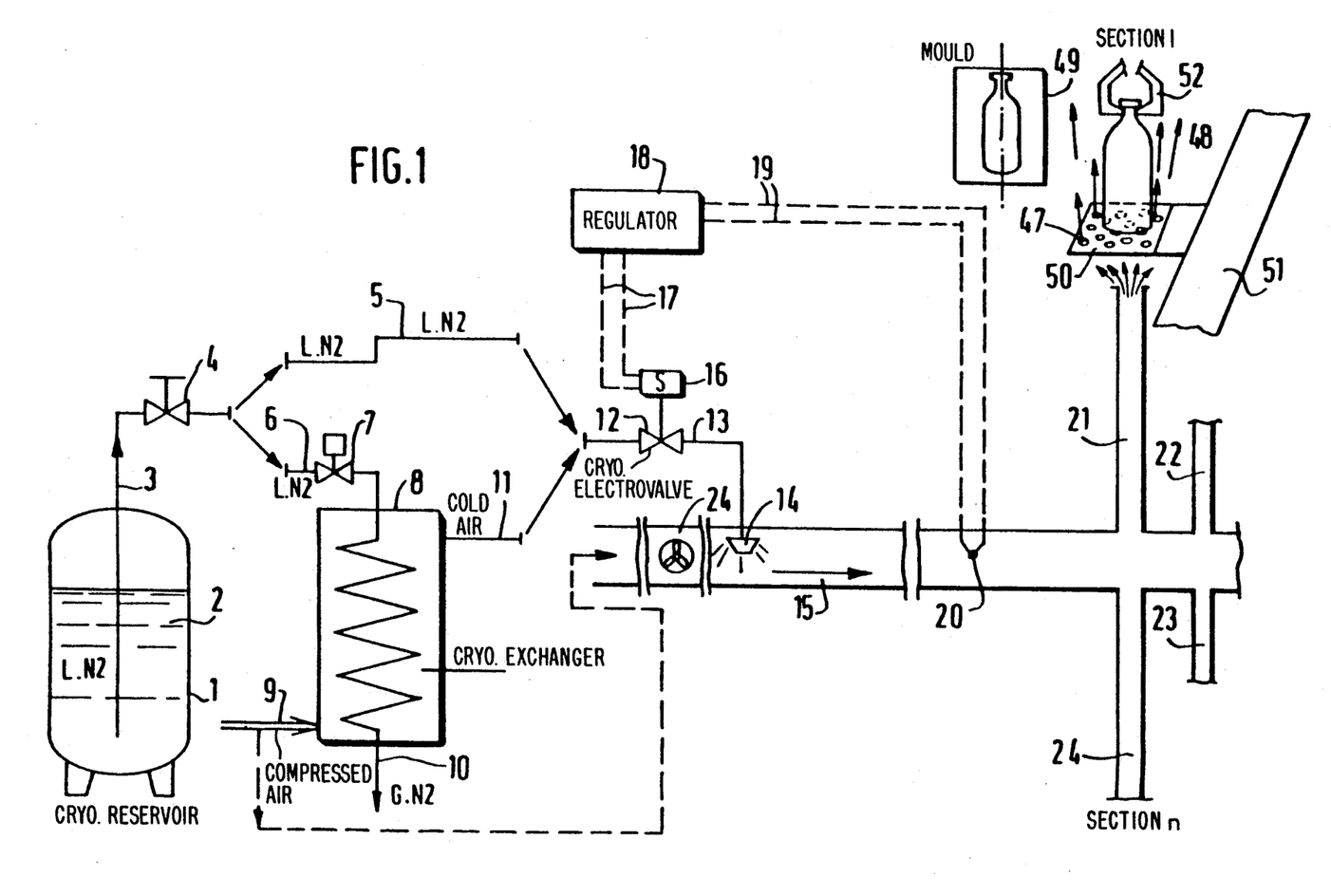
FIG. 1 is a schematic diagram showing an example of the carrying out of the invention comprising an overall control of the temperature of the ventilating air of the standby plates.

FIG. 1 shows an embodiment of the invention for controlling the ventilating air around the glass objects in the region of the standby plate. In this Figure, the cryogenic reservoir containing a cryogenic liquid 2, for example liquid nitrogen, is connected by the pipe 3 and the valve 4 and, according to a first embodiment, by the pipe 5 directly to the cryogenic electrovalve 12 or, according to a second embodiment, to the cryogenic electrovalve 7. The outlet of the valve 7 is connected to a heat exchanger 8 which delivers the vaporized gas to the atmosphere at its lower outlet (as viewed in FIG. 1). The ventilating air 9 from a compressed air generator is introduced at the base of the cryogenic exchanger 8 and escapes in the upper part of the latter through the pipe 11 which conducts it to the cryogenic electrovalve 12. The latter is connected by the pipe 13 to a vaporization nozzle 14 which vaporizes the liquefied gas or injects cooled air (or another negative calorie-carrying gas) into the pipe 15. The injected gas mixes with ventilating air conveyed by the fan 24 located on the upstream side of the nozzle and distributed in a plurality of pipes 21, 22, 23, 24, etc. Each of these pipes is connected to a standby plate of a section of the moulding machine (section is intended to mean in machines of this type the assembly of rough moulding and finishing moulds).

FIG. 1 illustrates a simple embodiment of the invention.

In this embodiment, there are two modes of operation. According to a first mode, the whole of the ventilating air of one or more machines is treated in an exchanger filled with cryogenic fluid such as liquid nitrogen, liquid hydrogen, liquid carbon dioxide, liquid oxygen, liquid helium, liquid argon, etc. According to this first mode, the temperature probe 20 measures the temperature of the ventilating air, and the regulator 18 then controls the opening or closing of the valve 12 (via the control device 16) so as to inject cool air issuing from the exchanger 8 at a predetermined temperature. The dimensions of this exchanger will be adapted to the desired flow. Another mode involves injecting a cryogenic fluid such as liquid nitrogen, liquid carbon dioxide, liquid helium, etc., into the ventilating air pipe and upstream of the machine or machines, the temperature being maintained by the temperature probe 20 the regulator 18, the control device 16 and the valve 12 to adjust the injections of cryogenic fuids. The temperature probe 20 is placed at any suitable point in the pipe 15 at a more or less large distance from the injection nozzle 14 and is connected by connections 19 to the regulator 18. When the temperature of the ventilating air in the pipe 15 is higher than the set temperature, the regulator 18 delivers a signal on the electric connection 17 which causes the opening of the cryogenic electric valve 12 through its control device 16. The regulator 18 may operate in accordance with two distinct modes: a first mode samples the temperature of the ventilating air in the pipe 15 at regular intervals. If the sampled temperature is lower than or equal to the set temperature, no control signal is sent to the electrovalve 12. If the temperature is higher than the set temperature, this valve is opened produce a predetermined known flow, during a fixed interval of time less than the sampling period. The cycle is repeated at each sampling measurement. A second mode effects a quasi-continuous measurement of the temperature of the ventilating air by a sampling at a much higher frequency than in the first mode. When the temperature of the ventilated air is higher than that of the set value, the cryogenic valve 12 is opened and supplies fluid until the temperature measured by the probe 20 becomes less than or equal to the set value. The cryogenic value 12 is then closed.

It will be understood that temperature probes of the proportional type or of the D.I.P. type may be employed, but these devices have been found to be often too expensive for the profitability of the method, or too delicate to carry out. Much more simple solutions may be employed by using a temperature probe of the bimetallic strip type which supplies electric current to the electrovalve 12 when the measured temperature is higher than the set temperature. This in turn opens the cryogenic valve 12. Conversely, the electric supply to the electrovalve 12 is shut off when the measured temperature is lower than or equal to the set temperature, thus closing the electrovalve 12.

Figure 2:
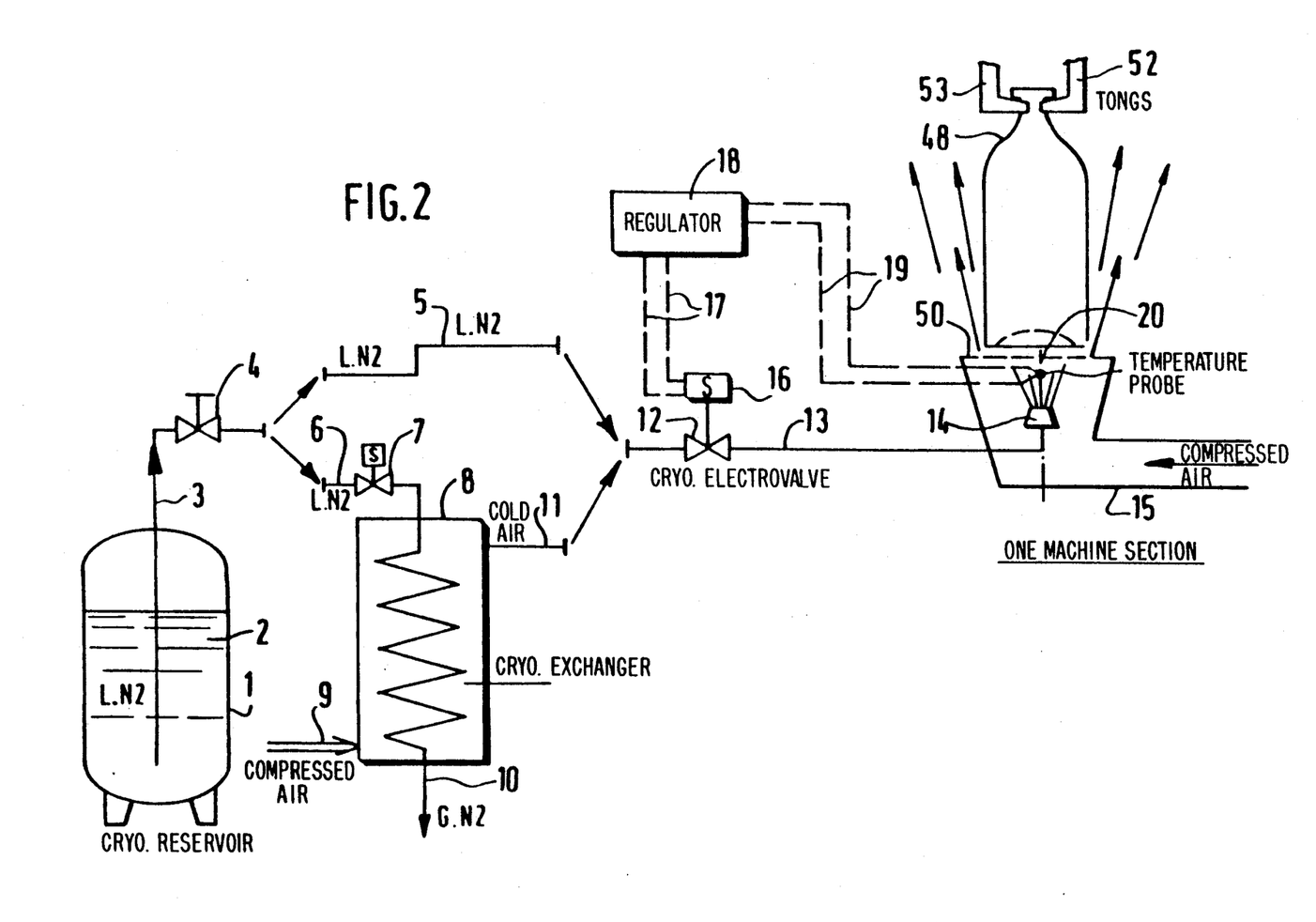
FIG. 2 is a schematic diagram showing a second embodiment of the invention comprising controlling the temperature of the ventilating air of the standby plates in the region of each of the latter.

FIG. 2 shows an embodiment of the invention which may be employed alone or in combination with the embodiment shown in FIG. 1. In this FIG. 2, the same elements as those of FIG. 1 carry the same references. The cold air issuing from the cryogenic exchanger 8 or the liquefied gas arriving through the pipe 5 passes through the cryogenic electrovalve 12 under the control of the regulator 18 which receives temperature information from the temperature probe 20. In the FIG. 2 embodiment the probe 20 is placed in proximity to the cryogenic injection nozzle 14, and the nozzle itself is placed in the ventilating air pipe 15 just below or in proximity to the standby plate 50. The temperature probe 20 preferably is located between the nozzle and the standby plate.

By controlling the temperature level of the whole of the ventilating air in the course of time such as explained with reference to FIG. 1, the efficiency of the machine is increased. However, in some cases, temperature deviations are found in each section of a machine in the region of the standby plates due for example to variations in the pressure drop (caused by pipes of different length, etc.) where the sections operating under less good conditions will reduce the efficiency of the machine. The embodiment disclosed in this FIG. 2 enables the temperature to be controlled in the region of each standby plate; i.e. in the region of each section of the machine.

According to this embodiment, a cryogenic fluid such as liquid nitrogen, liquid carbon dioxide, liquid helium, etc. may be injected into the ventilating air circuit just below the standby plate. The temperature probe is placed in proximity to the cryogenic injection. After homogenization of the temperature, the regulator 18 controls the opening and closing cycles of the cryogenic valve 12. The required negative calorie complement may be obtained by injecting a gas, for example, air, previously cooled in a cryogenic exchanger fed with a fluid such as liquid nitrogen, liquid argon, liquid carbon dioxide, liquid oxygen, liquid hydrogen, liquid helium, etc . . . The temperature is controlled in the same way as that described hereinbefore. Such an embodiment affords the advantage of employing a cooling fluid such as oxygen or hydrogen.

Figure 3:
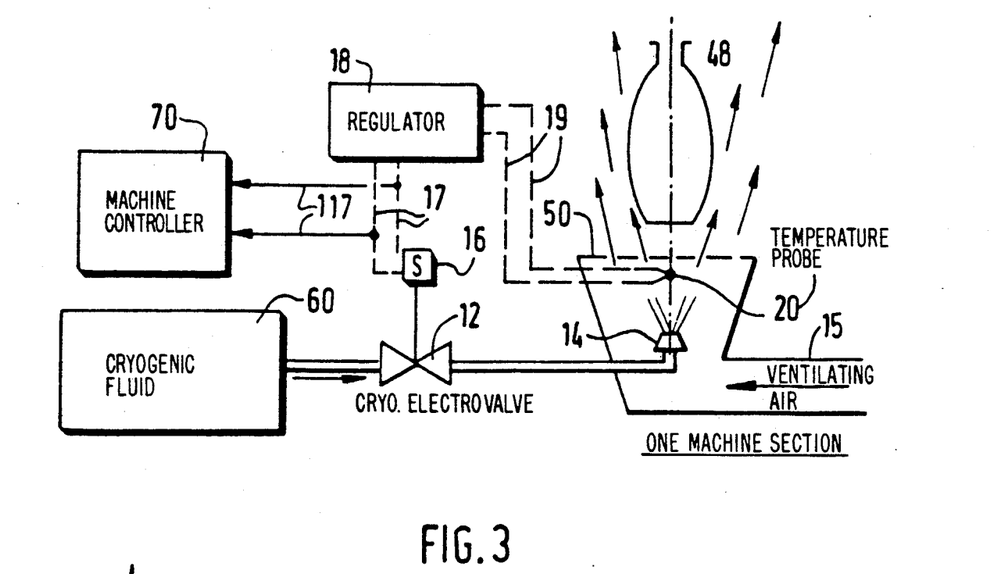
FIG. 3 is a schematic diagram showing a particularly advantageous embodiment of the invention comprising varying the refrigerating power during a glass object transport cycle.
Figure 4:
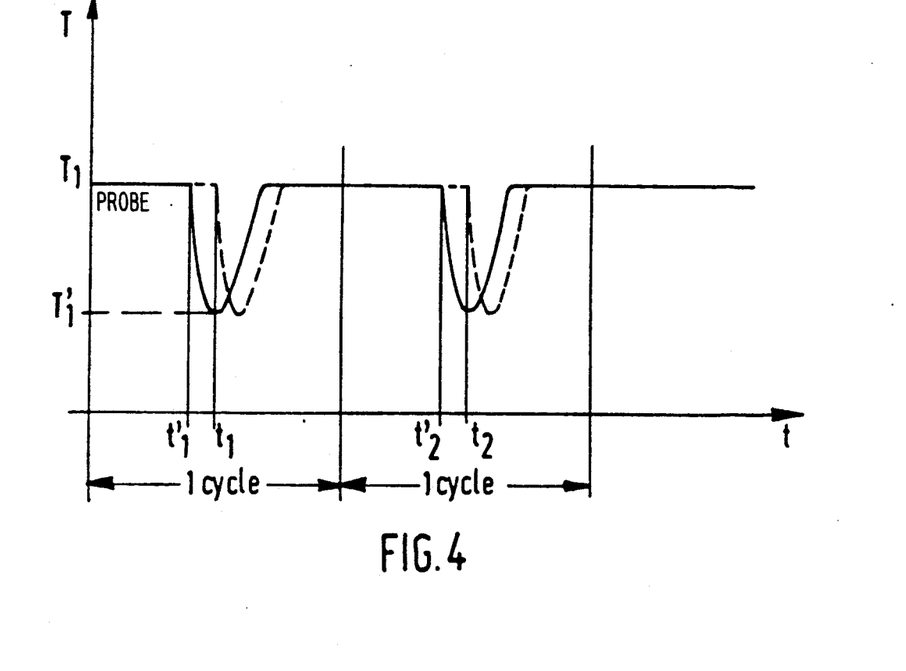
FIG. 4 is a graph illustrating the evolution with respect to time of the ventilating air temperature probe in the embodiment of FIG. 3.

FIGS. 3 and 4 illustrate a particularly advantageous embodiment of the invention, according to which the refrigerating power injected into the ventilating air just above the standby plate can be programmed in order to improve the productivity and the quality of the glass article produced. In these Figures, the same elements as those of the preceding Figures carry the same references. The cryogenic fluid and the cooled air are created in the same way as before by the unit represented by the reference 60. In this embodiment, the temperature probe 20 is placed, as in the case of FIG. 2, in proximity to the injection nozzle 14 of the cryogenic fluid or cooled air, below the standby plate 50. The electric lines 17 connecting the regulator to the control means 16 of the cryogenic electrovalve 12 are also connected to the electric lines 117 which are connected to means controlling the production machine 70. The operation of the system of FIG. 3 will be better understood with the aid of FIG. 4 in which the variations in the temperature T1 measured by the probe 20 are shown.

According to a first embodiment of the mode of operation of the system of FIG. 3; upon the arrival of the glass object above the standby plate at instant t1 the machine controller 70 opens the cryogenic electrovalve 12. This permits the injection of a predetermined quantity of cryogenic fluid or cold gas through the nozzle 14 which causes the temperature of the probe to drop from the value T1 to the value T'1 which is distinctly lower (on the order of about 50° C. to 150° C.). The larger the temperature difference the more rapidly is the temperature lowered. Then the temperature of the probe suddenly rises to the value T1.

According to a second preferred embodiment of the mode operation of the system shown in FIG. 3, the arrival of the glass object above the standby plate is anticipated by injecting at instant t'1, prior to the instant t1, cryogenic liquid or cold air through the nozzle 14, the cryogenic electrovalve 12 having its opening controlled by the control means of the machine 70. As before, a predetermined quantity of cryogenic liquid or cold gas is injected. In practice, this means that the cryogenic electrovalve is opened during a predetermined period of time in order to deliver a predetermined quantity of negative calories.

The instant t1 may correspond to the instant at which the glass object arrives above the standby plate (according to the embodiment shown in dotted lines in FIG. 4), but it may also be before the instant t1 at t'1, thereby permitting taking into account time constants due to the nature of the material concerned (glass-ventilating air).

This function is performed in FIG. 3 by a single valve 12, but in some cases it will be necessary to separate the different functions by means of a plurality of valves. Of course, the device of FIG. 3 is identical for each section of the machine, with a staggering of the control.

In FIG. 3, the injection of cryogenic fluid enables the glass object to be cooled more rapidly. However, in this FIGURE, the object is cooled more rapidly without benefitting from an increase in the manufacturing rates, as will be explained with the aid of FIG. 5.

Figure 5:
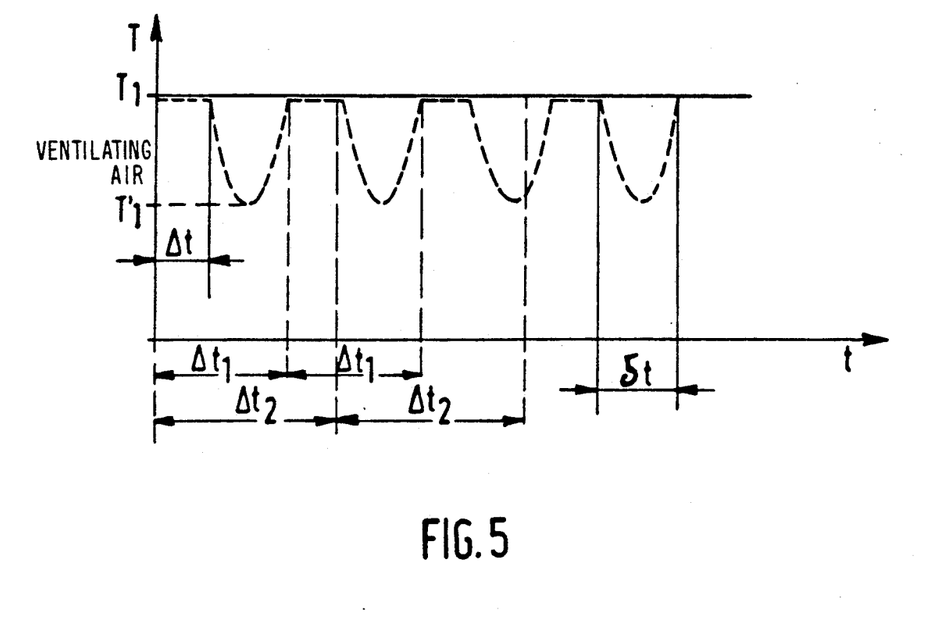
FIG. 5 is a graph illustrating the time versus temperature relationship; of FIG. 4 corresponding to an increase in the manufacturing rates.

In FIG. 5, $\Delta t_2$ represents the duration of a cycle according to the prior art. According to the invention, when the temperature of the ventilating air reaches the value $T_1$, the quantity of negative calories must be sufficient to enable the glass object to be immediately transferred to the transfer belt. Thus a cycle may have a duration $\Delta t_1$ which is distinctly shorter than $\Delta t_2$. This interval of time $\Delta t_1$ approximately represents the time of transfer of the glass object from the mould to the standby table, while St substantially represents the time during which the glass object is present above the standby plate.

Of course, there should be adjusted, in each particular case, the moment of injection of the cold gas or the cryogenic liquid as a function of the instant of arrival of the glass object above the standby plate. Generally, the injection will be slightly anticipated in order to gain time and therefore increase the productivity of the machine.

Figure 6:
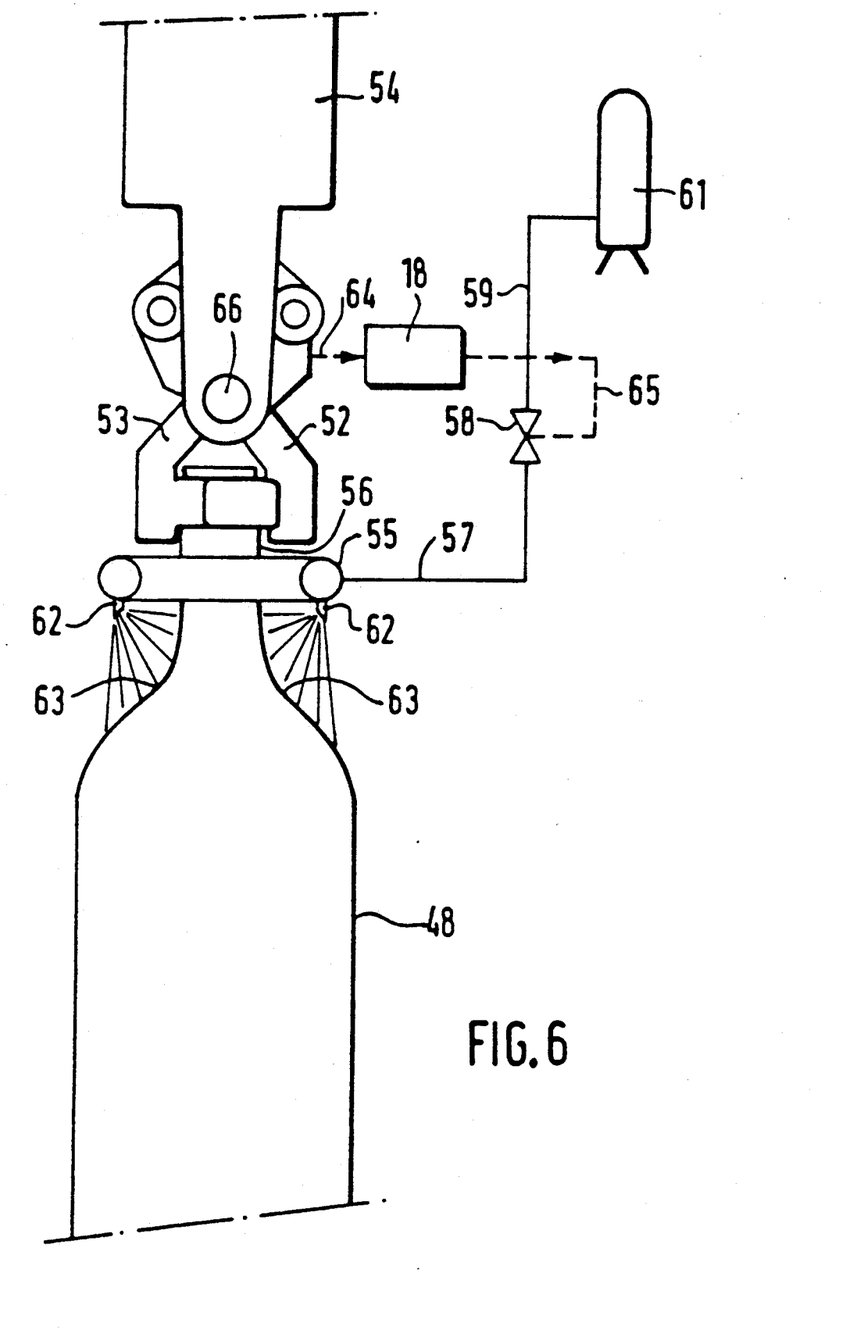
FIG. 6 is a schematic diagram showing a first embodiment of the quenching step in the region of the neck of the bottle.

FIG. 6 represents a first embodiment of the device for carrying out the cooling or quenching process according to the invention. The tongs 54 have two arms 52 and 53 movable around the pin 66 connected to the tongs support 54. The arms open and close for releasing the neck 56 of a bottle and for grasping the neck 56 of another bottle. The latter bottle is conveyed by the tongs from the finishing mould to the standby plate and then to the transfer belt.

A means for vaporizing the cryogenic liquid, here having the form of a tore 55, is connected to the support 54 by means not shown in the FIGURE. This tore is placed around the neck of the bottle. For this purpose, it is usually in one piece and surrounds the neck when the tongs are moved in the downward direction and the arms surround the upper part of the neck. According to one embodiment, the tore 55 may be formed by two semi-tores, each connected to or synchronized with the arms 52, 53 of the tongs. The semi-tores may be articulated at one of their ends, and be shaped such that the two halves are adjacent when the tongs are closed around the neck. Cryogenic liquid-spraying nozzles 62 are evenly spaced apart along axes substantially perpendicular to the median plane of the tore (and consequently substantially vertically when the tore is horizontal as shown in the Figure).

The spray nozzles 62 have such geometry and orientation that the jets of sprayed liquid will be distributed, preferably substantially uniformly, throughout the shoulder 63 of the bottle. As shown in the Figure, each jet is located within a conical envelope of about 90° at the apex, but different apex angles are possible.

The outside diameter of the tore is on the order of the diameter of the bottle, or slightly less, while the diameter of a circular section of the tore is sufficient to ensure the desired fluid flow. The inside diameter of the tore provides a sufficient opening at the centre for the passage of the neck.

The tore 55 is fed by one or more pipes 57 connected to a cryogenic reservoir 61 through the valve 58. This valve is controlled by a regulator 18 through the control line 65, the regulator being itself connected by a line 64 to the tongs 54 so as to synchronize the injection of the cryogenic fluid with the interval of time during which the tongs are closed, i.e. the time during which a bottle 48 is held between their arms. This injection may be slightly anticipated. It may be initiated, for example, as soon as the arms have started to close or the tore has reached the region of the neck.

Preferably, this injection will start when the tongs are closed.

The duration of this injection will be variable, but as short as possible in order to reduce the cost of the method to a minimum. It will terminate later when the tongs open for releasing the glass object.

The synchronization of the injection with the movement of the tongs and the duration of the injection is controlled by the regulator 18, known per se, which is part of the machine manufacturing glass objects. There will be added thereto in series, if necessary, known means for controlling the regular opening and closing of the valve 58 in order to create sequential injections of cryogenic fluid.

Figure 7A:
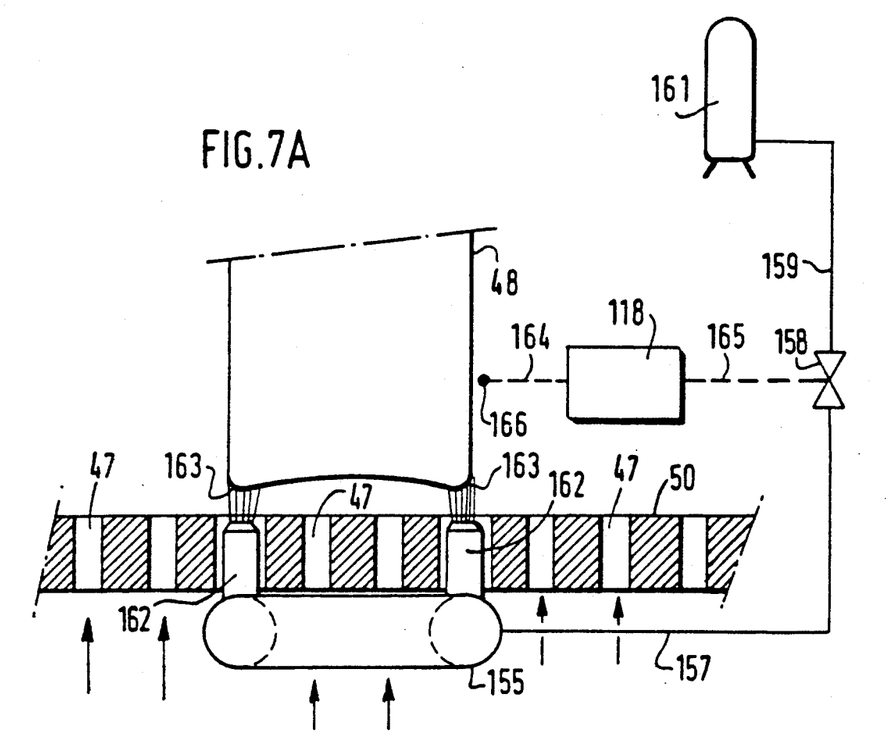
FIGS. 7A and 7B are schematic diagrams, partly in section, showing; a second embodiment of the quenching step in the region of the bottom of the bottle.
Figure 7B:
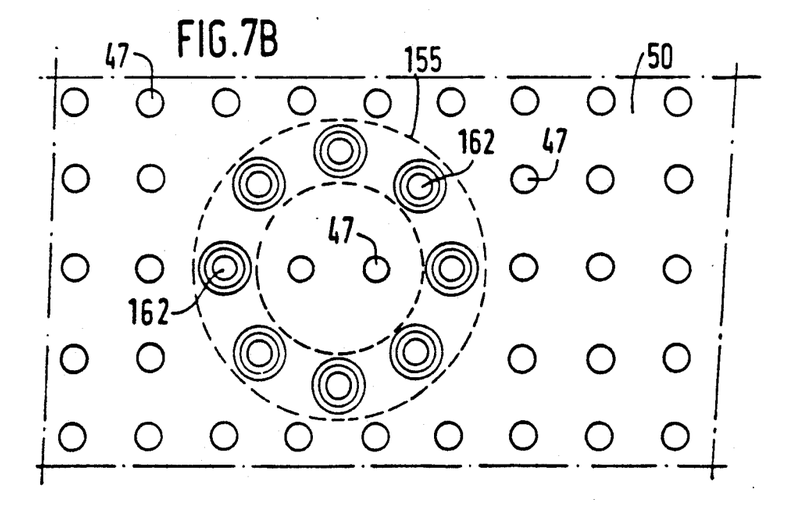

FIGS. 7A and 7B show an embodiment for quenching the bottom of the bottle. FIG. 7A is a view partly in section and partly diagrammatic illustrating the method and the device for carrying out the method. The standby plate 50 is provided, in the manner known per se, with a plurality of orifices 47 evenly spaced apart, for the passage of cooling air, diagrammatically represented by the upwardly pointing arrows in the Figure.

A tore 155 (having identical characteristics to the tore 55 of FIG. 6) is placed below the plate 50. The tore 155 is provided with a plurality of nozzles 162 which are evenly spaced apart on its upper periphery, extend into the orifices 47 and open out slightly below the upper level of the standby plate. These nozzles are evenly disposed substantially along the circumference 163 on which the glass object (here, the bottle) will subsequently come to bear in particular on the transfer belt. Depending on the type of objects manufactured, it is easy to change the tore 155 for adapting the dimensions thereof to those of the manufactured object. In the FIG. 6 embodiment the tore is generally chosen which has a diameter which will be suitable for all the bottle necks, but it is also possible to change the tore to accommodate necks of different diameters. This arrangement of the nozzles 162 in the openings such as 47 (or of larger diameter) is seen from above in FIG. 7B. The cryogenic liquid, either owing to the diameter of the tore or to the orientation of the nozzles, reaches the bottom of the bottle and the lateral wall of the bottle, as illustrated in FIG. 7A.

The tore 155 is connected, through the cryogenic electrovalve 158, to the cryogenic fluid reservoir 161.

The electrovalve is connected by a cable 165 to an electronic unit 118 of a type similar to the regulator 18 in FIG. 6. The unit 118 controls the opening and closing instants of the valve 158 and the duration of the opening (continuous opening or in sucessive sequences).

The unit 118 is connected by a cable 164 to a detector 166 which senses the presence of the glass object when this object is in a correct position above the tore 155.

The duration (continuous or sequential) of the injection of cryogenic fluid is regulated by the unit 118, and the rate of flow is regulated by the diameter of the nozzles 162 so as to minimize the consumption of said fluid. By simple routine trials, the strength of the bottom of the object may be improved and the standby time of the bottle above the standby plate reduced to improve both productivity and manufacturing rates. the bottom of the bottle may be quenched when the latter is transferred from the finishing mould to the standby plate, for example by means of a tube movable with the bottle (or any other like device). Thus the two treatments, whatever be the embodiments employed, may be simultaneous or sequential.

When a total quenching of the outer surface of the bottle is desired, the devices of FIG. 6 (modified) and FIGS. 7A and 7B (unmodified) may be used together. The device of FIG. 6 will be modified in that the diameter of the tore 55 and that of the nozzles 62 will be such that the whole of the lateral surface of the bottle will be able to receive the spraying of liquid or solid. The device of FIGS. 7A and 7B will be practically unmodified, although the spraying angle of the nozzles 162 may be altered to reach the central part of the bottom of the bottle. Optionally, nozzles may be added in the central openings 47 (FIG. 7B).

For the internal quenching (generally simultaneous) of the bottle, a simple cylindrical tube closed at its lower end and provided with openings or slots will be generally suitable. These openings will preferably be evenly spaced apart throughout the height of the tube in order to achieve a uniform spraying of the internal surface of the bottle. One or more openings (or nozzles) placed adjacent to the lower end of the tube permit a spraying of the internal bottom of the bottle.

We claim:

1. A process for manufacturing a glass object comprising the successive following steps:
   a) supplying at least a first mould with a glass gob;
   b) at least partially shaping a glass object from the glass gob in the first mould to form a shaped glass object;
   c) extracting the shaped glass object from the first mould using a handling device and transporting with the handling device the extracted object still at a temperature where it is deformable;
   d) spraying, during at least a part of step c) onto at least a determined outer part of the object and adjacent the handling device, a fluid cooled at a temperature lower than ambient temperature and at a flow rate which is kept lower than a flow rate limit value beyond which deformations of said part of the object occur; and
   e) transferring the partially cooled object towards a further processing station, wherein the fluid to be sprayed contains a cryogen.

2. The process of claim 1, wherein the fluid to be sprayed is cooled by injection of cryogen in timed relationship with spraying.

3. The process of claim 1, wherein the shaped object is at least part tubular and wherein the fluid is sprayed via a circular spraying means onto said tubular part.

4. The process of claim 1, wherein the handling device is tongs and wherein the fluid is sprayed onto at least a part of the object adjacent to the tongs.

5. The process of claim 1, wherein the shaped object is at least part hollow.

6. The process of claim 5, further comprising the step of spraying the fluid onto at least a determined inner part of the object.

7. The process of claim 6, wherein the fluid to be sprayed is cooled at a temperature which is low enough to cause a surface quenching of at least said inner part.

8. The process of claim 1, wherein the fluid to be sprayed is cooled at a temperature which is low enough to cause a surface quenching of at least said outer part.

9. The process of claim 1, wherein steps a) to d) are carried out at different stations of a multistation glass manufacturing apparatus, wherein the fluid to be sprayed is supplied to the different stations by separate conduit means, and further comprising the steps of monitoring the temperature of the fluid to be sprayed in each conduit means and of controlling the temperature by adjusting the content of cryogen in said fluid.

* * * * *